J. HALL.

TOY MONEY-BOX.

No. 7,614. Reissued April 17, 1877.

Witnesses:
G. B. Towles
Fr. O. Davis

Inventor:
John Hall
by W. Burris
Attorney

N. PETERS, PHOTO-LITHOGRAPHER, WASHINGTON, D. C.

UNITED STATES PATENT OFFICE.

JOHN HALL, OF WATERTOWN, MASSACHUSETTS.

IMPROVEMENT IN TOY MONEY-BOXES.

Specification forming part of Letters Patent No. 98,055; dated December 21, 1869; antedated December 7, 1869; reissue No. 7,614, dated April 17, 1877; application filed December 27, 1876.

*To all whom it may concern:*

Be it known that I, JOHN HALL, of Watertown, in the county of Middlesex and State of Massachusetts, have invented certain new and useful Improvements in Toy Banks; and I do hereby declare that the following is a full, clear, and exact description thereof, that will enable others skilled in the art to which it appertains to make and use the same, reference being had to the accompanying drawings, and to the letters of reference marked thereon, which form a part of this specification, and in which drawings—

Figure 1:
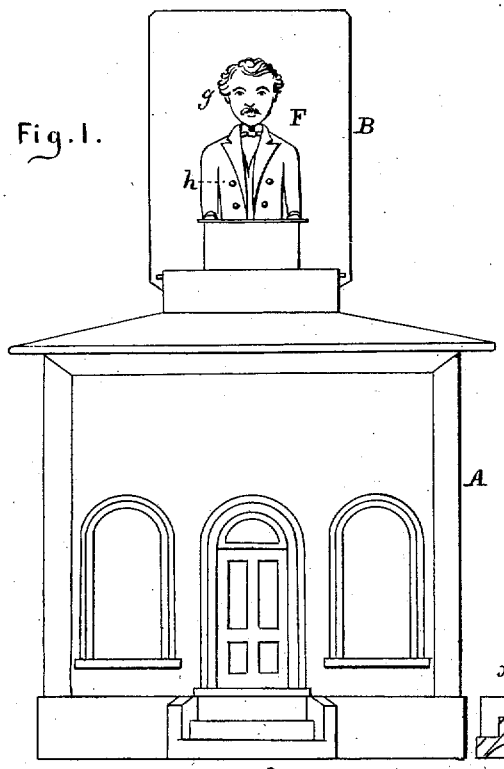
Figure 2:
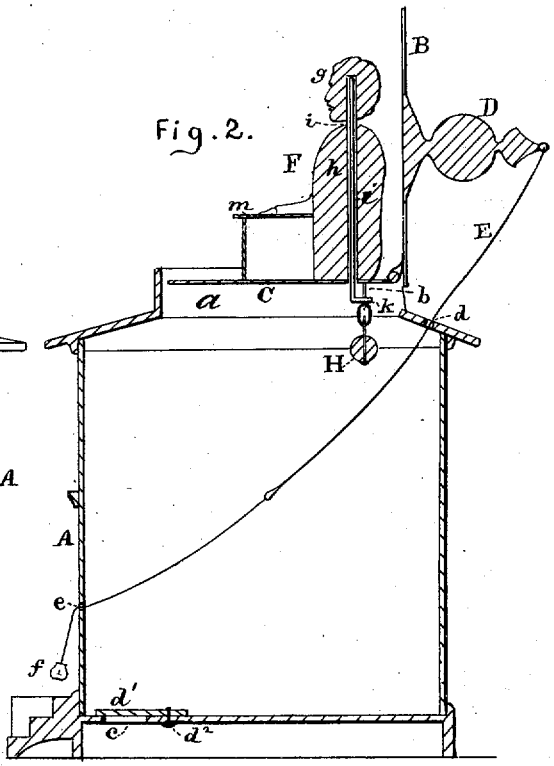
Figure 3:
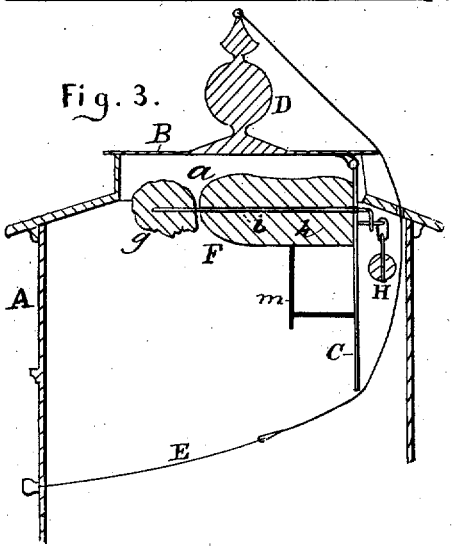
Figure 5:
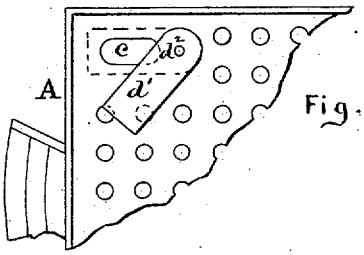
Figure 4:
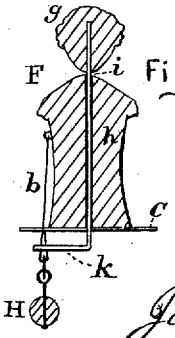

Figure 1 is a front elevation, showing the bank open. Fig. 2 is a vertical section of Fig. 1. Fig. 3 is a section on the same line as Fig. 2, showing the bank closed. Fig. 4 is a vertical section of the cashier detached, with connecting devices. Fig. 5 is a view of part of the bottom of the bank, showing the opening and adjustable cover for removing deposits.

My invention consists of a toy bank having a mechanical figure representing a cashier, adjusted to receive and deposit the money in the bank, forming a toy for the amusement of children and a safe deposit for small coins, as hereinafter more fully described.

A is a box made in the form of a bank-building, having a door and windows in front. On the top of the bank is an opening, *a*, covered by a hinged door, B. C is a platform, the size of the opening *a*, attached at right angles to the door B. D represents a balance projection, attached to the outside of the door, and provided at the top with a knob, or an eye, or a ring for attaching the cord or wire E, which extends downward through a hole, *d*, in the top, and through a hole, *e*, in the front of the bank, and is provided with a knob, *f*, for opening the door B of the bank. F is a mechanical figure, representing a bank cashier, attached on the platform, with his back to the door B and face to the front of the bank, when opened, as shown in the drawings. The head *g* of the cashier is pivoted to the body *h* by the rod *i*, extended through the body, and provided at the lower end with an arm, *k*, at right angles to the rod. H is a pendulum-weight, attached by a link-joint to a rod, *b*, which is extended through an eye in the arm *k*, and attached at the top to the side of the cashier, as seen in the drawings.

The bottom of the bank is provided with an opening, *c*, and adjustable cover $d^1$, attached by a screw, $d^2$, through the bottom. A small tablet, *m*, is adjusted in front of the cashier to receive the money.

The bank is opened by pulling the knob *f*, raising the door B and the cashier to an upright position, and the platform C to a horizontal position, closing the opening *a*, as shown in Figs. 1 and 2 of the drawings. This operation of raising the cashier oscillates the pendulum-weight and rod H *b*, imparting a quick reciprocating rotary motion to the head of the cashier, imitating the natural motion of a person's head.

The cashier and door B, when raised to an upright position, as shown in Figs. 1 and 2, are so nearly poised, by means of the balance D and pendulum H *b*, that the weight of a small coin placed on the tablet *m* bears it downward, depositing the money and closing the bank, as shown in Fig. 3 of the drawings.

To remove the deposits the screw $d^2$ is loosened and the cover $d^1$ turned, so as to open the port *c* in the bottom, as shown in Fig. 5 of the drawings; and when the cover is readjusted over the port the screw may be tightened to hold the cover more securely in place.

What I claim as new, and desire to secure by Letters Patent, is—

1. A toy bank provided with a mechanical figure representing a cashier, adjusted to receive and deposit money in the bank, substantially as described.

2. A toy bank provided with a mechanical figure having a movable head, operated by mechanism, substantially as and for the purposes described.

3. A toy bank having an opening, *a*, door B, platform C, and balance D, and provided with a mechanical figure, F, having a movable head, *g*, and tablet *m*, operated by means of knob and cord or wire E *f*, pendulum H *b*, and rod *i*, substantially as and for the purposes described.

4. A toy bank provided with an opening, *c*, and an adjustable cover, $d^1$, attached by a screw, $d^2$, for removing deposits from the bank, substantially as described.

In testimony that I claim the foregoing I have hereunto set my hand.

JOHN HALL.

Witnesses:

TILDEN G. ABBOTT,
CHARLES W. BERRY.